United States Patent
Saxena et al.

(10) Patent No.: US 10,227,930 B2
(45) Date of Patent: Mar. 12, 2019

(54) COMPRESSOR BLEED SYSTEMS IN TURBOMACHINES AND METHODS OF EXTRACTING COMPRESSOR AIRFLOW

(71) Applicant: General Electric Company, Schenectady, NY (US)

(72) Inventors: Swati Saxena, Schenectady, NY (US); Ajay Keshava Rao, Karnataka (IN); Rudolf Konrad Selmeier, Bavaria (DE); Grover Andrew Bennett, Esperance, NY (US); Giridhar Jothiprasad, Clifton Park, NY (US); Corey Bourassa, Mechanicville, NY (US); Byron Andrew Pritchard, Loveland, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 347 days.

(21) Appl. No.: 15/082,524

(22) Filed: Mar. 28, 2016

(65) Prior Publication Data

US 2017/0276141 A1     Sep. 28, 2017

(51) Int. Cl.
*F02C 6/08* (2006.01)
*F02C 9/18* (2006.01)
*F04D 29/54* (2006.01)

(52) U.S. Cl.
CPC ............ *F02C 9/18* (2013.01); *F02C 6/08* (2013.01); *F04D 29/542* (2013.01); *F05D 2260/607* (2013.01)

(58) Field of Classification Search
CPC ...... F01D 17/105; F01D 9/041; F04D 27/023; F04D 29/526; F04D 29/542; F04D 29/682; F02C 6/08; F02C 9/18; F05D 2260/607
See application file for complete search history.

(56) References Cited

U.S. PATENT DOCUMENTS

| 3,846,038 A | * | 11/1974 | Carriere | ............... F01D 5/145 |
| | | | | 415/1 |
| 4,182,117 A | * | 1/1980 | Exley | ................... F02C 6/08 |
| | | | | 415/208.3 |

(Continued)

FOREIGN PATENT DOCUMENTS

CN         204200674 U      3/2015

*Primary Examiner* — Igor Kershteyn
*Assistant Examiner* — Topaz L. Elliott
(74) *Attorney, Agent, or Firm* — GE Global Patent Operation; Nitin Joshi

(57) ABSTRACT

A compressor assembly for a turbomachine includes a compressor wall including circumferentially spaced stator vanes defining at least one row of stator vanes. The at least one row of stator vanes defines at least one stator passage therein. Each stator vane includes a leading edge, an opposite trailing edge defining an axial chord distance, and a pressure side. The compressor assembly also includes, at least one bleed opening defined within the compressor wall and disposed adjacent the pressure side in the at least one stator passage within a range from approximately 20% the axial chord distance upstream of the leading edge to approximately 20% the axial chord distance downstream of the trailing edge. The compressor assembly further includes at least one bleed arm extending from the at least one bleed opening with at least a portion of compressor airflow extractable through the at least one bleed arm.

19 Claims, 9 Drawing Sheets

(56) References Cited

U.S. PATENT DOCUMENTS

| | | | |
|---|---|---|---|
| 4,820,122 A | 4/1989 | Hall et al. | |
| 4,844,689 A | 7/1989 | Seed | |
| 5,203,162 A | 4/1993 | Burge | |
| 5,209,633 A | 5/1993 | McGreehan et al. | |
| 5,531,565 A * | 7/1996 | Meindl | F04D 29/541 415/144 |
| 6,325,595 B1 | 12/2001 | Breeze-Stringfellow et al. | |
| 6,438,941 B1 * | 8/2002 | Elliott | F01D 17/105 60/226.1 |
| 6,550,254 B2 * | 4/2003 | Proctor | F01D 9/041 415/144 |
| 6,663,346 B2 * | 12/2003 | Munsell | B64D 13/00 415/115 |
| 6,783,324 B2 | 8/2004 | Muny | |
| 7,527,675 B2 | 5/2009 | Bertuccioli et al. | |
| 7,594,793 B2 | 9/2009 | Guemmer | |
| 7,806,659 B1 | 10/2010 | Liang | |
| 7,837,753 B2 * | 11/2010 | Roundy | F02C 7/052 55/385.3 |
| 7,874,158 B2 | 1/2011 | O'Neill et al. | |
| 8,092,145 B2 | 1/2012 | Martel et al. | |
| 8,142,153 B1 | 3/2012 | Liang | |
| 8,292,567 B2 * | 10/2012 | Damle | F01D 9/041 415/1 |
| 8,484,982 B2 * | 7/2013 | Martensson | F02C 3/13 60/782 |
| 8,943,791 B2 | 2/2015 | Tibbott et al. | |
| 9,085,994 B2 * | 7/2015 | Kojima | F01D 25/12 |
| 9,181,962 B2 * | 11/2015 | Touyeras | F04D 29/681 |
| 9,909,497 B2 * | 3/2018 | Feulner | F02C 6/08 |
| 2008/0152500 A1 | 6/2008 | Mehring | |
| 2011/0067378 A1 | 3/2011 | Tibbott et al. | |
| 2012/0210722 A1 | 8/2012 | Hynum et al. | |
| 2013/0011266 A1 | 1/2013 | Gallagher et al. | |
| 2013/0170982 A1 | 7/2013 | Benson et al. | |
| 2014/0369804 A1 | 12/2014 | Fishler | |
| 2015/0132115 A1 * | 5/2015 | Wunderer | F04D 19/00 415/169.1 |
| 2015/0159551 A1 * | 6/2015 | Lahmer | F01D 17/16 415/145 |
| 2015/0247424 A1 | 9/2015 | Schwarz et al. | |
| 2016/0376915 A1 * | 12/2016 | Grothe | F01D 5/12 415/149.2 |

* cited by examiner

COMPRESSOR BLEED SYSTEMS IN TURBOMACHINES AND METHODS OF EXTRACTING COMPRESSOR AIRFLOW

BACKGROUND

The field of the disclosure relates generally to gas turbine engines and, more particularly, to compressor bleed assemblies and their associated locations in turbomachines and methods of extracting compressor airflow.

At least some known turbomachines, i.e., gas turbine engines, include a compressor that compresses air via a plurality of rotatable compressor blades adjacent to a stationary stator row, and a combustor that ignites a fuel-air mixture to generate combustion gases. The combustion gases are channeled through rotatable turbine blades in a turbine via a hot gas path. Such known turbomachines convert thermal energy of the combustion gas stream to mechanical energy used to generate thrust and/or rotate a turbine shaft to power an aircraft. Output from the turbomachine may also be used to power a machine, for example, an electric generator, a compressor, or a pump.

Many of these known turbomachines include compressor bleed systems that extract compressed air from the compressor for a variety of applications and functions, including, but not limited to, turbine cooling, customer bleed flow applications, and/or engine start/high throttle operating conditions. Generally, the bleed location on a compressor wall is downstream of the stator row and extends around the annulus of the wall. Extracting high pressure compressed air from this compressor wall location may cause flow turbulence within the compressor, thereby reducing engine performance. Additionally, when turbomachines encounter operating conditions with a high level of dust particles, the dust particles may be centrifuged within the compressor thereby increasing the likelihood of entering the bleed system and further reducing engine performance. For example, during compressor bleed for turbine cooling, dust particles can enter the cooling air circuits, accumulating around small features such as rims, film cooling holes, and turbulators, decreasing the effectiveness of cooling the high temperature components, and preventing cooling bleed air from directly contacting heat transfer surfaces of the high temperature components.

BRIEF DESCRIPTION

In one aspect, a compressor assembly for a turbomachine is provided. The compressor assembly includes a compressor wall including a plurality of circumferentially spaced stator vanes substantially defining at least one row of stator vanes. The at least one row of stator vanes defines at least one stator passage therein. Each stator vane of the at least one row of stator vane includes a leading edge defining an upstream direction, an opposite trailing edge defining a downstream direction, and a pressure side. The leading edge and the trailing edge also define an axial chord distance. The compressor assembly also includes, at least one bleed opening defined within the compressor wall and disposed adjacent the pressure side in the at least one stator passage at an axial position within a range from approximately 20% the axial chord distance upstream of the leading edge to approximately 20% the axial chord distance downstream of the trailing edge. The at least one bleed opening is coupled in flow communication with the at least one stator passage. The compressor assembly further includes at least one bleed arm extending from the at least one bleed opening and coupled in flow communication with the at least one stator passage. Compressor airflow is channelable through the at least one stator passage. At least a portion of the compressor airflow is extractable through the at least one bleed arm.

In a further aspect, a compressor assembly for a turbomachine is provided. The compressor assembly includes a compressor wall including a plurality of circumferentially spaced stator vanes substantially defining at least one row of stator vanes. The at least one row of stator vanes defines at least one stator passage therein. Each stator vane of the at least one row of stator vane includes a leading edge defining an upstream direction, an opposite trailing edge defining a downstream direction, and a suction side. The leading edge and the trailing edge also define an axial chord distance. The compressor assembly also includes, at least one bleed opening defined within the compressor wall and disposed adjacent the suction side in the at least one stator passage at an axial position within a range from approximately 20% the axial chord distance upstream of the leading edge to approximately 20% the axial chord distance downstream of the leading edge or disposed adjacent the suction side leading edge in the at least one stator passage at an axial position within a range from approximately 10% the axial chord distance upstream of the trailing edge to approximately 20% the axial chord distance downstream of the trailing edge. The at least one bleed opening is coupled in flow communication with the at least one stator passage. The compressor assembly further includes at least one bleed arm extending from the at least one bleed opening and coupled in flow communication with the at least one stator passage. Compressor airflow is channelable through the at least one stator passage. At least a portion of the compressor airflow is extractable through the at least one bleed arm.

In another aspect, a method of extracting compressor airflow from a turbomachine is provided. The turbomachine includes a compressor wall having a plurality of circumferentially spaced stator vanes substantially defining at least one row of stator vanes. The at least one row of stator vanes defines at least one stator passage therein. Each stator vane of the at least one row of stator vane includes a leading edge defining an upstream direction, an opposite trailing edge defining a downstream direction, and a pressure side. The leading edge and the trailing edge also define an axial chord distance. The turbomachine also includes, at least one bleed opening defined within the compressor wall and disposed adjacent the pressure side in the at least one stator passage. The at least one bleed opening is coupled in flow communication with the at least one stator passage. The turbomachine further includes at least one bleed arm extending from the at least one bleed opening and coupled in flow communication with the at least one stator passage. The method includes inducing compressor airflow in the at least one stator passage. The method further includes extracting at least a portion of the compressor airflow from the at least one stator passage at the at least one bleed opening at an axial position within a range from approximately 20% the axial chord distance upstream of the leading edge to approximately 20% the axial chord distance downstream of the trailing edge.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The compressor bleed systems described herein facilitate increasing turbomachine performance. Specifically, the compressor bleed systems have a bleed arm extending from a bleed opening located within a stator passage. In some embodiments, the bleed opening is positioned such that a particle concentration within a particle-laden compressor flow is reduced within an extracted bleed air flow. Reducing particle intake of the compressor bleed air flow increases turbomachine performance and reduces maintenance costs. In other embodiments, the bleed opening is positioned such that the particle concentration within the particle-laden compressor flow is increased with the extracted bleed air flow. Reducing particles within compressor flow reduces maintenance costs of the turbomachine. Additionally, the bleed opening and bleed arm are sized such that aerodynamic flow of compressor flow and bleed air flow within is increased, e.g., decreasing turbulent fluid flow therein. Increasing aerodynamic flow of compressor flow and bleed air flow reduces flow separation and pressure losses. Moreover, locating the compressor bleed system within the stator passage facilitates reducing overall compressor length, by reducing blade row axial length, thereby reducing turbomachine weight and increasing performance.

Figure 1:
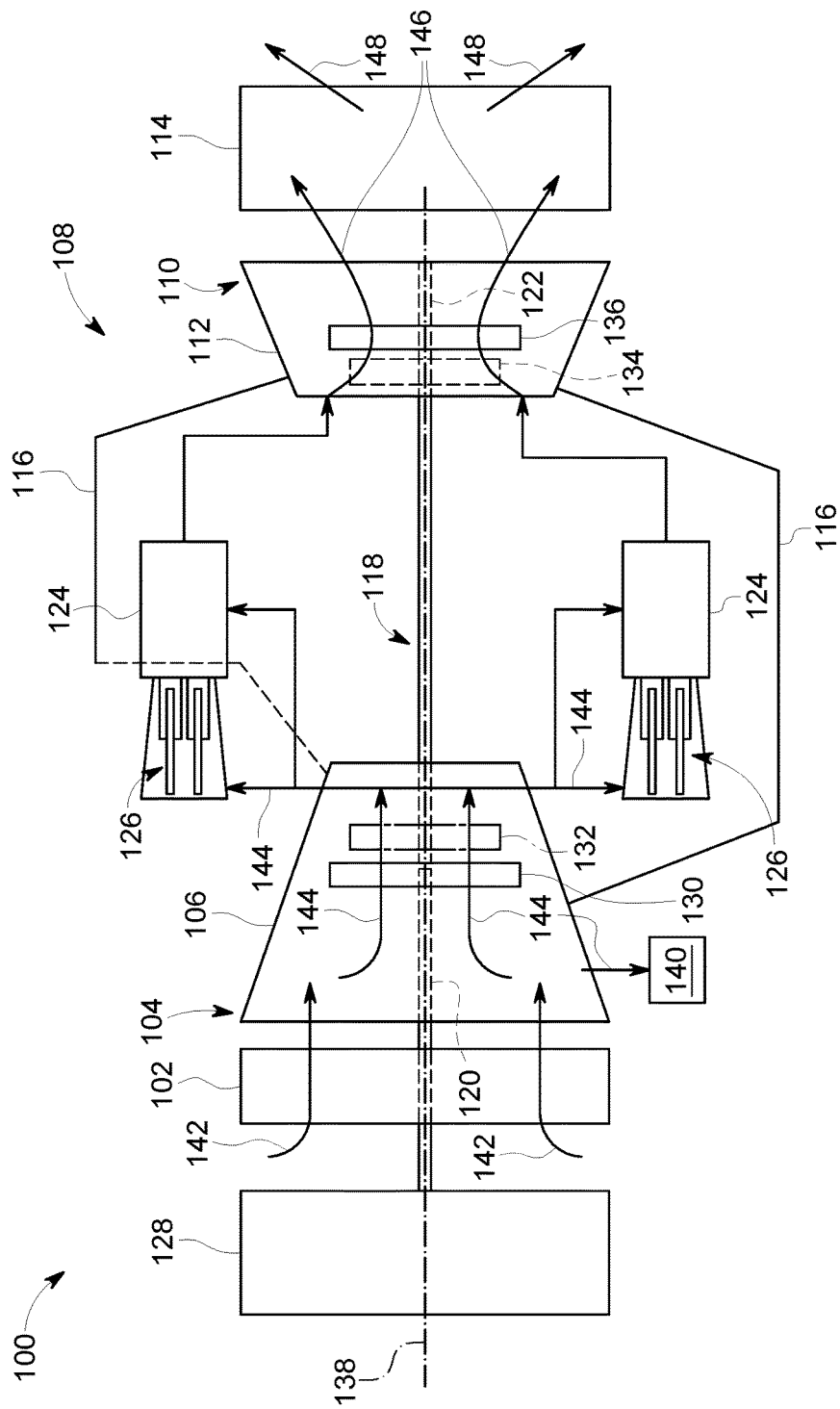
FIG. 1 is a schematic diagram of an exemplary turbomachine, i.e., a turbofan.

As used herein, the terms "axial" and "axially" refer to directions and orientations which extend substantially parallel to a centerline 138, as shown in FIG. 1, of a turbine engine. Moreover, the terms "radial" and "radially" refer to directions and orientations which extend substantially perpendicular to the centerline of the turbine engine. In addition, as used herein, the terms "circumferential" and "circumferentially" refer to directions and orientations which extend arcuately about the centerline of the turbine engine. The term "fluid," as used herein, includes any medium or material that flows, including, but not limited to, air.

FIG. 1 is a schematic view of a turbomachine 100, i.e., a gas turbine engine, and more specifically, an aircraft engine or turbofan. In the exemplary embodiment, turbomachine 100 includes an air intake section 102, and a compressor section 104 that is coupled downstream from, and in flow communication with, intake section 102. Compressor section 104 is enclosed within a compressor casing shroud or wall 106. A combustor section 108 is coupled downstream from, and in flow communication with, compressor section 104, and a turbine section 110 is coupled downstream from, and in flow communication with, combustor section 108. Turbine section 110 is enclosed within a turbine casing 112 and includes an exhaust section 114 that is downstream from turbine section 110. A combustor housing 116 extends about combustor section 108 and is coupled to compressor casing 106 and turbine casing 112. Moreover, in the exemplary embodiment, turbine section 110 is coupled to compressor section 104 via a rotor assembly 118 that includes, without limitation, a compressor rotor, or drive shaft 120 and a turbine rotor, or drive shaft 122.

In the exemplary embodiment, combustor section 108 includes a plurality of combustor assemblies, i.e., combustors 124 that are each coupled in flow communication with compressor section 104. Combustor section 108 also includes at least one fuel nozzle assembly 126. Each combustor 124 is in flow communication with at least one fuel nozzle assembly 126. Moreover, in the exemplary embodiment, turbine section 110 and compressor section 104 are rotatably coupled to a fan assembly 128 via drive shaft 120. Alternatively, turbomachine 100 may be a gas turbine engine and for example, and without limitation, be rotatably coupled to an electrical generator and/or a mechanical drive application, e.g., a pump. In the exemplary embodiment, compressor section 104 includes at least one compressor stage that includes a compressor blade assembly 130 and an adjacent stationary stator vane assembly 132. Each compressor blade assembly 130 includes a plurality of circumferentially spaced blades (not shown) and is coupled to rotor assembly 118, or, more specifically, compressor drive shaft 120. Each stator vane assembly 132 includes a plurality of circumferentially spaced stator vanes (not shown) and is coupled to compressor wall 106 and defining a stator passage therein.

Also, in the exemplary embodiment, turbine section 110 includes at least one turbine blade assembly 134 and at least one adjacent stationary nozzle assembly 136. Each turbine blade assembly 134 is coupled to rotor assembly 118, or, more specifically, turbine drive shaft 122 along a centerline 138. Moreover, in the exemplary embodiment, turbomachine 100 includes a compressor bleed system 140 extending from compressor wall 106 and in flow communication with compressor section 104.

In operation, air intake section 102 channels air 142 towards compressor section 104. Compressor section 104 compresses air 142 to higher pressures and temperatures prior to discharging compressed air 144 towards combustor section 108. Compressed air 144 is channeled to fuel nozzle assembly 126, mixed with fuel (not shown), and burned within each combustor 124 to generate combustion gases 146 that are channeled downstream towards turbine section 110. After impinging turbine blade assembly 134, thermal energy is converted to mechanical rotational energy that is used to drive rotor assembly 118. Turbine section 110 drives compressor section 104 and/or fan assembly 128 via drive shafts 120 and 122, and exhaust gases 148 are discharged through exhaust section 114 to the ambient atmosphere.

Additionally, during operation, a portion of compressed air 144 may be extracted from compressor wall 106 about stator vane assembly 132 via compressor bleed system 140. Compressor bleed system 140 extracts compressed air 144 from stator vane assembly 132 for a variety of applications and functions, such as, but not limited to, turbine cooling, customer bleed flow applications, and/or engine start/high throttle operating conditions. During operation, air 142 may include particles, particularly when turbomachine 100 operates in arid and air-polluted regions, which enter turbomachine 100. Particles are channeled with air 142 towards compressor section 104. At compressor section 104, particles are centrifuged towards compressor wall 106 by compressor blade assembly 130 rotating about centerline 138 which increases the dust particles entering compressor bleed system 140. When particles enter compressor bleed system 140, some applications have decreased efficiency, such as turbine cooling due to particles accumulating around the cooling features, decreasing cooling effectiveness and preventing cooling bleed air from contacting heat transfer surfaces. However, some applications for compressor bleed system 140 are not affected by particles, such as customer bleed flow applications.

Figure 2:
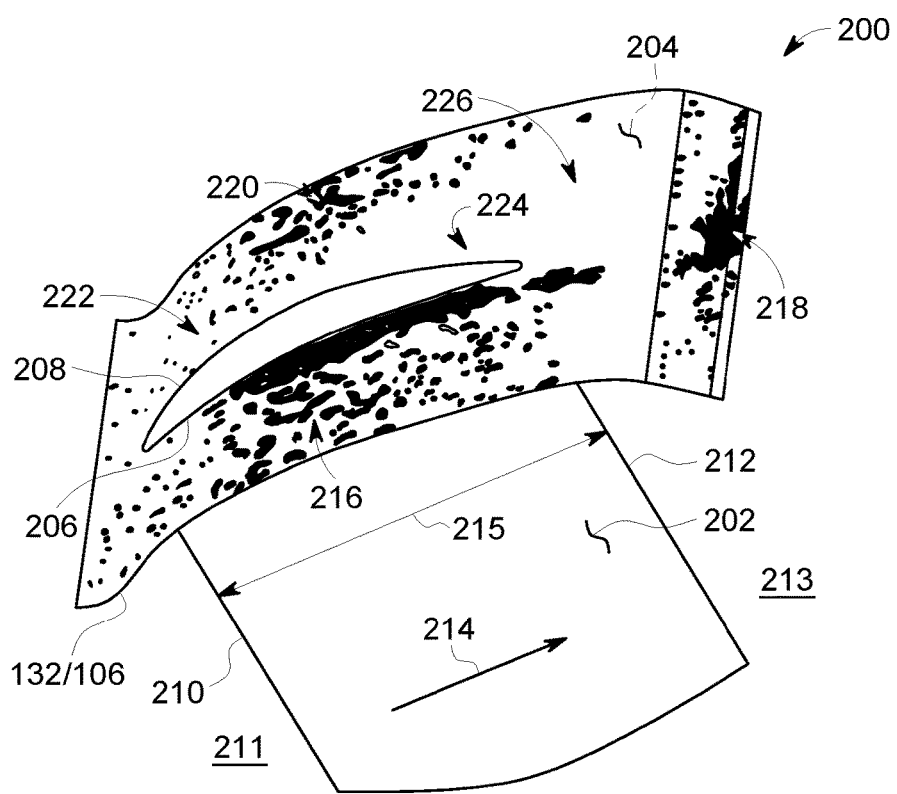
FIG. 2 is a particle impact diagram of an exemplary compressor wall section that may be found within the turbomachine shown in FIG. 1.

FIG. 2 is a particle impact diagram 200 of a portion of compressor wall 106 that may be found within turbomachine 100 (shown in FIG. 1) and described above. In the exemplary diagram 200, a single stator vane 202 coupled to a radially inner surface 204 of compressor wall 106 is illustrated. Stator vane 202 has an airfoil such that a pressure side 206 and an opposite suction side 208 are formed. Additionally, stator vane 202 includes a leading edge 210 positioned within an upstream area 211 within stator vane assembly 132 and an opposite trailing edge 212 positioned with a downstream area 213 within stator vane assembly 132. An axial chord distance 215 is defined as the axial distance between leading edge 210 and trailing edge 212. When particle-laden air flow 214 is channeled through each compressor stage, blade assembly 130 is rotated about drive shaft 120 accelerating air flow 214 and stator vane assembly 132 converts the increased velocity of air flow 214 into pressurized compressed air flow 214 via diffusion. As particle-laden air flow 214 flows through blade assembly 130, centrifugal forces cause particles therein to centrifuge towards compressor wall 106. Particle impact diagram 200 illustrates particle impact frequency on compressor wall 106 during air flow 214 through stator vane assembly 132.

Particles within air flow 214 generally have a high particle impact at compressor wall 106 locations identified as 216, 218, and 220, and generally particles have a low particle impact at compressor wall 106 locations identified as 222, 224, and 226. For example, a first high particle impact area 216 occurs generally on compressor wall 106 adjacent to stator vane 202 along pressure side 206. A second high particle impact area 218 occurs generally on compressor wall 106 downstream of stator vane 202. A third high particle impact area 220 occurs generally on compressor wall 106 adjacent to stator vane 202 offset from suction side 208. Further, a first low particle impact area 222 occurs generally on compressor wall 106 adjacent to leading edge 210 of stator vane 202 along suction side 208. A second low particle impact area 224 occurs generally on compressor wall 106 adjacent to trailing edge 212 of stator vane 202 along suction side 208. A third low particle impact area 226 occurs generally on compressor wall 106 downstream of stator vane 202 offset from suction side 208.

During operation of turbomachine 100 (shown in FIG. 1), compressor bleed system 140 extracts a portion of air flow 214 for a variety of applications and functions. On one hand, locating compressor bleed system 140 at an area within compressor wall 106 that has a high particle impact ratio, such as areas 216, 218, or 220, facilitates extracting particles from air flow 214 and into compressor bleed system 140. On the other hand, locating compressor bleed system 140 at an area within compressor wall 106 that has a low particle impact ratio, such as areas 222, 224, or 226, facilitates reducing particles extracted from air flow 214 and into compressor bleed system 140.

Figure 3:
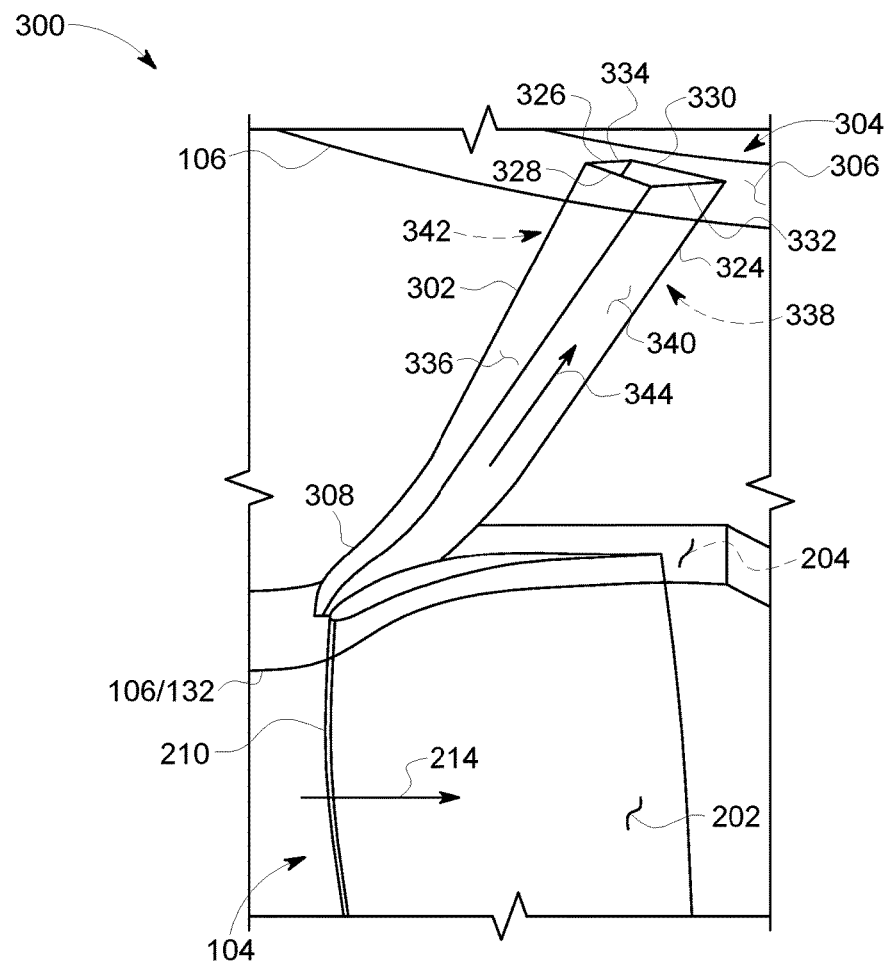
FIG. 3 is a perspective view of an exemplary compressor bleed system that may be used with the turbomachine shown in FIG. 1.
Figure 4:
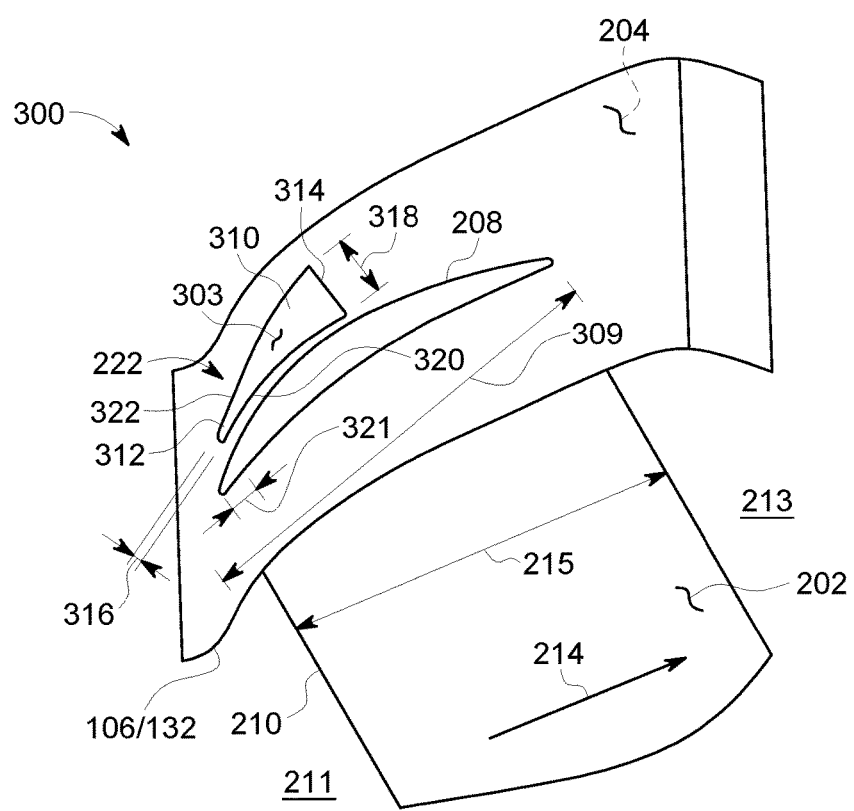
FIG. 4 is a schematic view of the compressor bleed system shown in FIG. 3.
Figure 5:
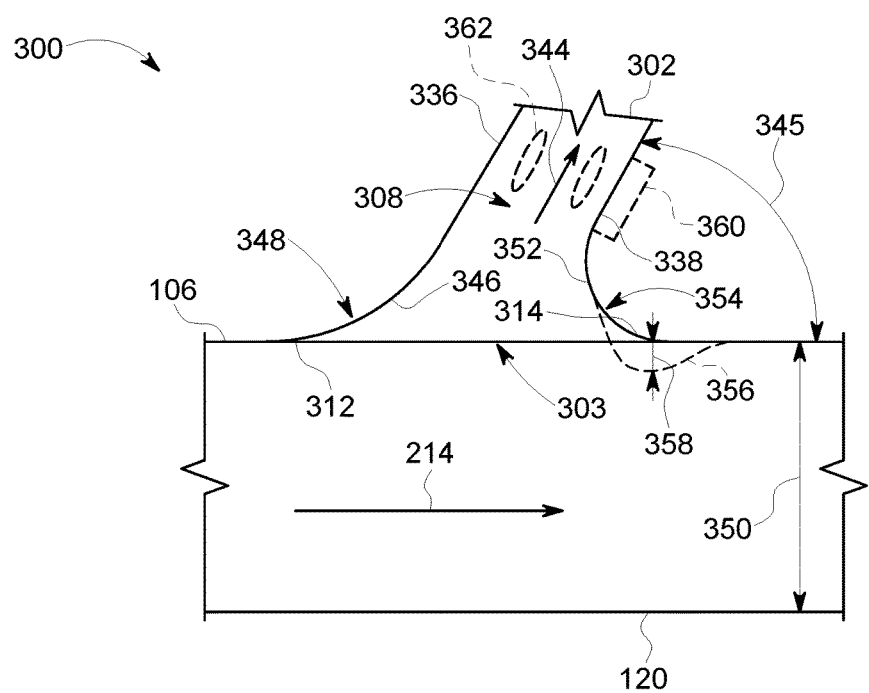
FIG. 5 is a section view of the compressor bleed system shown in FIG. 3.

FIG. 3 is a perspective view of an exemplary compressor bleed system 300 that may be used with turbomachine 100 (shown in FIG. 1). FIG. 4 is a schematic view of compressor bleed system 300. FIG. 5 is a section view of compressor bleed system 300. Referencing FIGS. 3-5, in the exemplary embodiment, stator vane 202 is coupled to radially inner surface 204 of compressor wall or shroud 106. Adjacent to stator vane 202, compressor bleed system 300 includes a plurality of circumferentially spaced passages or bleed arms 302 extending from an opening or bleed opening 303 on radially inner surface 204 of compressor wall 106. Bleed arm 302 disposed within compressor wall 106 couples compressor section 104 in flow communication with a plenum 304. Specifically, bleed arm 302 extends from radially inner surface 204 of compressor wall 106 to a radially outer surface 306 of compressor wall 106.

An inlet section 308 of bleed arm 302 is positioned adjacent to suction side 208 leading edge 210 of stator vane 202 at radially inner surface 204. In the exemplary embodiment, inlet section 308 is axially positioned within compressor wall 106 in a range 309 from approximately 20% chord distance 215 upstream of leading edge 210 to approximately 20% chord distance 215 downstream of trailing edge 212. For example, FIG. 4 illustrates inlet section 308 located generally within low particle impact area 222 (shown in FIG. 2) which is axially positioned adjacent to suction side 208 in a range from approximately 20% of chord distance 215 upstream of leading edge 210 to approximately 20% if chord distance 215 downstream of leading edge 210. Inlet section 308 is defined by a generally polygonal-shaped perimeter 310 of bleed opening 303 on radially inner surface 204 that includes an upstream edge 312 and an opposite downstream edge 314. In the exemplary embodiment, upstream edge 312 has a length 316 that is less than a length 318 of downstream edge 314. Further, perimeter 310 includes a first side edge 320 that extends from upstream edge 312 to downstream edge 314 adjacent to suction side 208 of stator vane 202 such that first side edge 320 substantially mirrors the curvature of stator vane 202. Perimeter 310 also includes a second side edge 322 that extends from upstream edge 312 to downstream edge 314 opposite first side edge 320. In the exemplary embodiment, upstream edge 312 is offset a downstream axial distance 321 from leading edge 210 approximately 10% of chord distance 215. Bleed arm 302 further includes an outlet section 324 at radially outer surface 306 and adjacent to plenum 304. Outlet section 324 is also defined by a generally polygonal-shaped perimeter 326 with an upstream edge 328, a downstream edge 330, a first side edge 332, and an opposite second side edge 334.

In alternative embodiments, bleed arm 302 and/or bleed opening 303 have any other location and/or geometry that enables compressor bleed system 300 to operate as described herein. For example, in some embodiments, bleed opening 303 has a continuous shape defining a perimeter, such as perimeter 310, which includes a plurality of connected segments that are each continuous function lines that touch at the connection point. This is also known as class $C^0$ continuity between each perimeter section. Examples of continuous shapes with continuous function lines include polygons, quadrilaterals, or triangles. In other embodiments, bleed opening 303 has a continuous shape defining a perimeter which includes a plurality of connected segments that are each a continuously differentiable function line that share a common tangent direction at the connection point. This is also known as class $C^1$ continuity between each perimeter section. Examples of continuous shapes with continuously differentiable function lines include ellipses or circles.

In the exemplary embodiment, bleed arm 302 extends from stator vane assembly 132 to plenum 304. Bleed arm 302 generally has a polygonal-shaped cross-section that varies along its length. For example, perimeter 326 of outlet section 324 is substantially different than perimeter 310 of inlet section 308. Furthermore, bleed arm 302 is defined by an upstream wall 336 that extends from upstream edge 312 to upstream edge 328, a downstream wall 338 that extends from downstream edge 314 to downstream edge 330, a first side wall 340 that extends from first side edge 320 to first side edge 332, and an opposite second side wall 342 that extends from second side edge 322 to second side edge 334. In the exemplary embodiment, bleed arm 302 is at an angle 345 from compressor wall 106. For example, angle 345 is within a range from approximately 20° to approximately 170°.

Further in the exemplary embodiment, upstream edge 312 includes an upstream blend nose 346 that couples upstream wall 336 to compressor wall 106. Upstream nose 346 has a blend radius 348 that is greater than 2% of a distance 350 defined between compressor wall 106 and compressor rotor 120. Also, downstream edge 314 includes a downstream blend nose 352 that couples downstream wall 338 to compressor wall 106. Downstream nose 352 has a blend radius 354 that is greater than 2% of distance 350. Both upstream and downstream noses 346 and 352 are aerodynamically contoured to reduce pressure loss and to avoid flow separation from the surface of the extracted bleed air flow 344. As shown in FIG. 5, upstream nose radius 348 is greater than downstream nose radius 354. In an alternative embodiment, upstream nose radius 348 is substantially equal to downstream nose radius 354. In an alternative embodiment, a downstream nose 356 extends radially inward from compressor wall 106 into the stator passage. Downstream nose 356 extends a distance 358 of approximately 10% of distance 350.

During operation, air flow 214 is induced and channeled through compressor section 104 through stator vanes 202. A portion of air flow 214, bleed air flow 344, is channeled through bleed arm 302 via bleed opening 303 and into plenum 304. At least one extraction port (not shown) is positioned within plenum 304 and extracts bleed air flow 344 therein for a variety of turbomachine 100 applications and functions. In the exemplary embodiment, the location and geometry of bleed system 300 facilitates reducing particle entry and facilitates increasing aerodynamic flow properties of air flow 214 and bleed air flow 344.

For example, to facilitate reducing particle entry into compressor bleed system 300, inlet section 308 is located within low particle impact area 222. Specifically, bleed opening 303 is adjacent to leading edge 210 of stator vane 202 along suction side 208. Further, the geometry of bleed arm 302 facilitates reducing particle entry into bleed system 300. Specifically, angle 345 and upstream and downstream noses 346 and 352 are defined such that bleed air flow 344 has to sharply turn to enter bleed arm 302 and particles within are separated due to inertia and continue downstream with air flow 214. In some embodiments, the particles that do stay entrained within bleed air flow 344 are collected by a scavenger 360 coupled to bleed arm 302 adjacent to bleed opening 303.

In alternative embodiments, bleed arm 302 has any other location and/or geometry that enables compressor bleed system 300 to operate as described herein. For example, to extract particles from air flow 214, bleed opening 303 and inlet section 308 are located in high particle impact areas 216, 218, and/or 220 (shown in FIG. 2). Also, to extract particles, angle 345 and upstream and downstream noses 346 and 352 are defined such that bleed air flow 344 has a shallow turn and particles stay entrained within bleed air flow 344. In some embodiments, bleed arm 302 includes downstream nose 356 that extends radially inward from radially inner surface 204 such that bleed arm 302 increases extraction of small particles from air flow 214 that are centrifuged out towards compressor wall 106.

Additionally, the location and geometry of bleed system 300 facilitates increasing aerodynamic flow properties. The geometry of bleed arm 302 facilitates maintaining the pressure of bleed air flow 344 from inlet section 308 to outlet section 324, such that pressure loss therein is reduced. For example, the cross-sectional area throughout the length of bleed arm 302 having a varying cross-sectional polygonal-shaped perimeter is substantially similar such that bleed air flow 344 pressure is substantially maintained. Further, the geometry of bleed arm 302 facilitates reducing separation of bleed air flow 344 such that acoustic resonance within bleed arm 302 is reduced. For example, upstream wall 336 has a curvature radius between radially inner surface 204 of compressor wall 106 and radially outer surface 306 of compressor wall 106 such that turbulence within bleed air flow 344 is reduced. Moreover, the geometry of bleed opening 303 and inlet section 308 at inner surface 204 facilitates increasing aerodynamic flow of air flow 214 through stator vanes 202. For example, length 316 of upstream edge 312 is less than length 318 of downstream edge 314 which reduces pressure loss within air flow 214. In some embodiments, bleed arm 302 includes stationary airfoils 362 that are coupled to the wall of bleed arm 302, which also facilitates increased pressure recovery at the bleed exit.

Furthermore, in the exemplary embodiment, the overall axial length of compressor section 104 (shown in FIG. 1) is reduced. For example, positioning bleed opening 303 and inlet section 308 of bleed arm 302 within stator vane assembly 132 facilitates shorting the axial spacing distance between stator vane assembly 132 and the adjacent compressor blade assembly 130.

Figure 6:
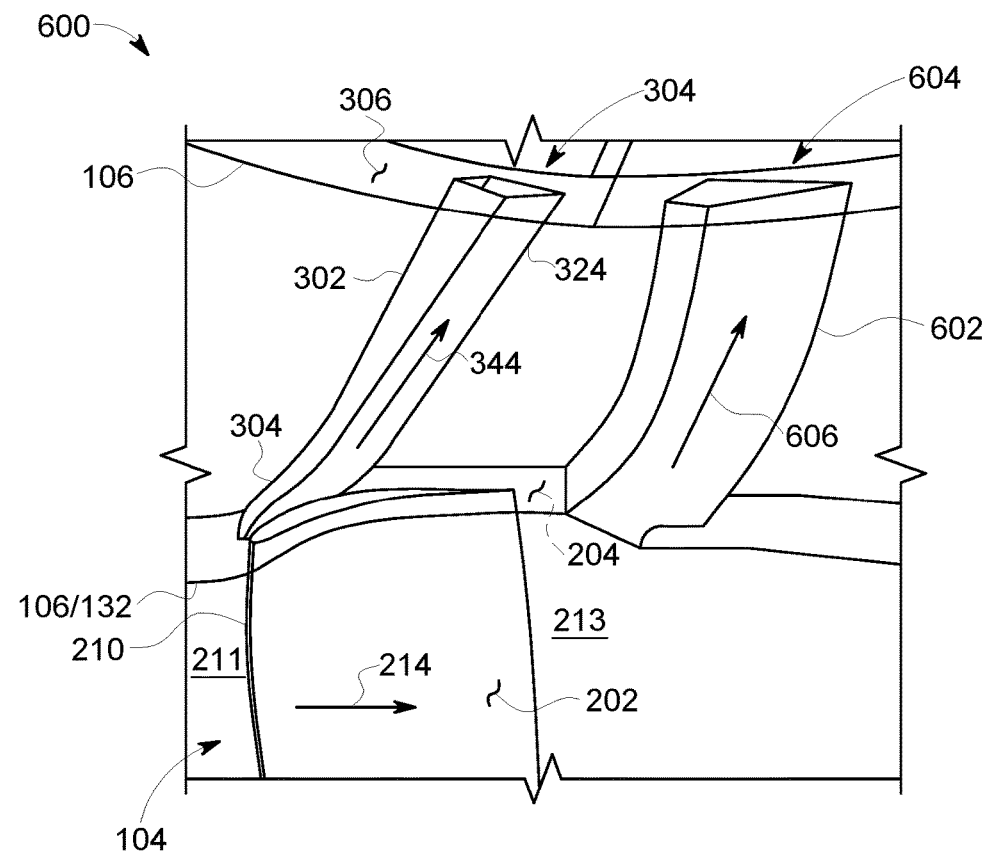
FIG. 6 is a perspective view of an alternative compressor bleed system that may be used with the turbomachine shown in FIG. 1.

FIG. 6 is a perspective view of an alternative compressor bleed system 600 that may be used with turbomachine 100 (shown in FIG. 1). In this alternative embodiment, compressor bleed system 600 includes stator vane 202 coupled to radially inner surface 204 of compressor wall 106, and adjacent to stator vane 202 is a plurality of circumferentially spaced bleed arms 302 extending from radially inner surface 204 of compressor wall 106 as described above with reference to FIGS. 3-5. Additionally, in this embodiment, compressor bleed system 600 further includes a plurality of circumferentially spaced second bleed arms 602. In this alternative embodiment, second bleed arm 602 is downstream of stator vane 202. Second bleed arm 602 couples compressor section 104 in flow communication with a second plenum 604. Specifically, second bleed arm 602 extends from radially inner surface 204 of compressor wall 106 to a radially outer surface 306 of compressor wall 106.

During operation, air flow 214 is channeled through compressor section 104 through stator vanes 202. A portion of air flow 214, bleed air flow 344, is channeled through bleed arm 302 and into plenum 304. At least one extraction port (not shown) is positioned within plenum 304 and extracts bleed air flow 344 therein for turbomachine 100 applications and functions that utilize bleed air with reduced entrained particles, for example, cooling air. A second portion of air flow 214, second bleed air flow 606, is channeled through second bleed arm 602 and into plenum 604. At least one extraction port (not shown) is positioned within plenum 604 and extracts second bleed air flow 606 therein for turbomachine 100 applications and functions that utilize bleed air with entrained particles, for example, engine start/high throttle operating conditions.

In this alternative embodiment, second bleed arm 602 is illustrated downstream of bleed arm 302. It should be appreciated that with compressor bleed system 600, each bleed arm 302 and 602 may be circumferentially spaced such that bleed arm 302 is circumferentially offset from second bleed arm 602. Further, in alternative embodiments, compressor bleed system 600 includes, but is not limited to, three or four bleed arms, such that compressor bleed system 600 is enabled to function as described herein.

Figure 7:
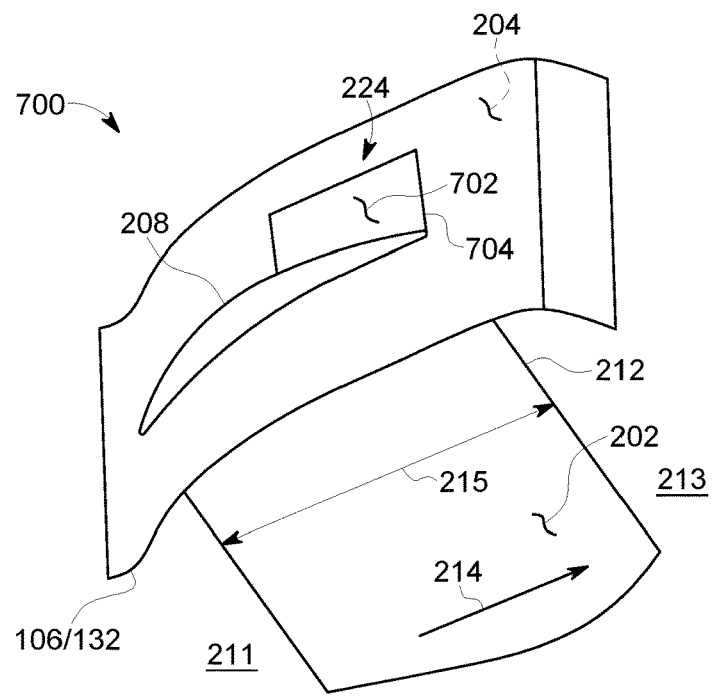
FIG. 7 is a schematic view of another alternative compressor bleed system that may be used with the turbomachine shown in FIG. 1.

FIG. 7 is a schematic view of another alternative compressor bleed system 700 that may be used with turbomachine 100 (shown in FIG. 1). In this alternative embodiment, compressor bleed system 700 includes stator vane 202 coupled to radially inner surface 204 of compressor wall 106 as described above with reference to FIGS. 3-5. Additionally, compressor bleed system 700 includes a bleed opening 702 coupled to a bleed arm (not shown) and positioned adjacent to suction side 208 trailing edge 212 of stator vane 202 at radially inner surface 204. For example, bleed opening 702 is located generally within low particle impact area 224 (shown in FIG. 2). Bleed opening 702 is defined by a generally polygonal-shaped perimeter 704 on radially inner surface 204. In alternative embodiments, bleed opening 702 has any other shape, including, but not limited to, rectangular, square, elliptical, and circular that enables compressor bleed system 700 to function as described herein.

During operation, air flow 214 is channeled through compressor section 104 through stator vanes 202. A portion of air flow 214 is channeled through bleed opening 702 and into the bleed arm. In this alternative embodiment, the placement of bleed opening 702 is such that compressor bleed system 700 facilitates reducing particle entry therein.

Figure 8:
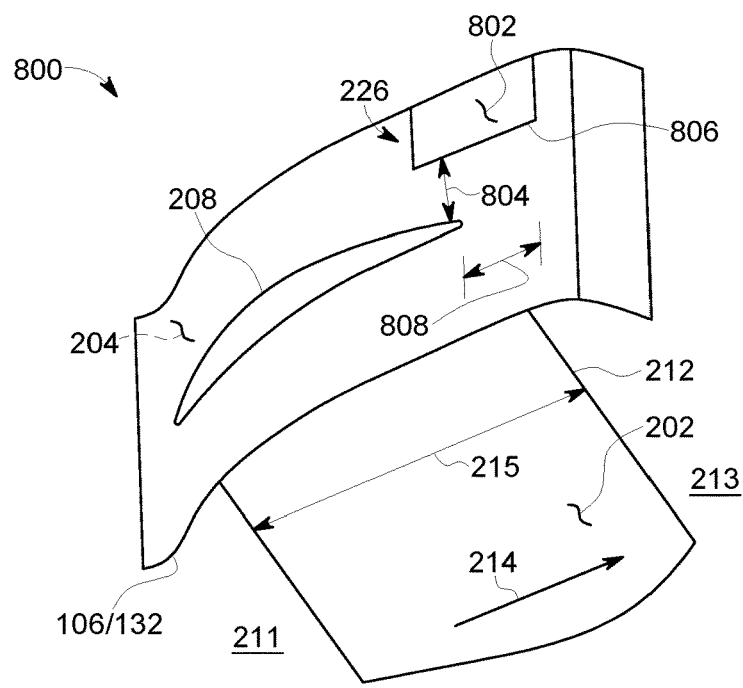
FIG. 8 is a schematic view of a further alternative compressor bleed system that may be used with the turbomachine shown in FIG. 1.

FIG. 8 is a schematic view of another alternative compressor bleed system 800 that may be used with turbomachine 100 (shown in FIG. 1). In this alternative embodiment, compressor bleed system 800 includes stator vane 202 coupled to radially inner surface 204 of compressor wall 106 as described above with reference to FIGS. 3-5. Additionally, compressor bleed system 800 includes a bleed opening 802 coupled to a bleed arm (not shown) and positioned adjacent to suction side 208 trailing edge 212 at a predetermined offset distance 804 of stator vane 202 at radially inner surface 204. For example, bleed opening 802 is located generally within low particle impact area 226 (shown in FIG. 2). Bleed opening 802 is defined by a generally polygonal-shaped perimeter 806 on radially inner surface 204. In this alternative embodiment, bleed opening 802 is axially positioned within a range from approximately 10% of chord distance 215 upstream of trailing edge 212 to approximately 20% of chord distance 215 downstream 808 from trailing edge 212. In alternative embodiments, bleed opening 802 has any other shape, including, but not limited to, rectangular, square, elliptical, and circular that enables compressor bleed system 800 to function as described herein.

During operation, air flow 214 is channeled through compressor section 104 through stator vanes 202. A portion of air flow 214 is channeled through bleed opening 802 and into the bleed arm. In this alternative embodiment, the placement of bleed opening 802 is such that compressor bleed system 800 facilitates reducing particle entry therein.

Figure 9:
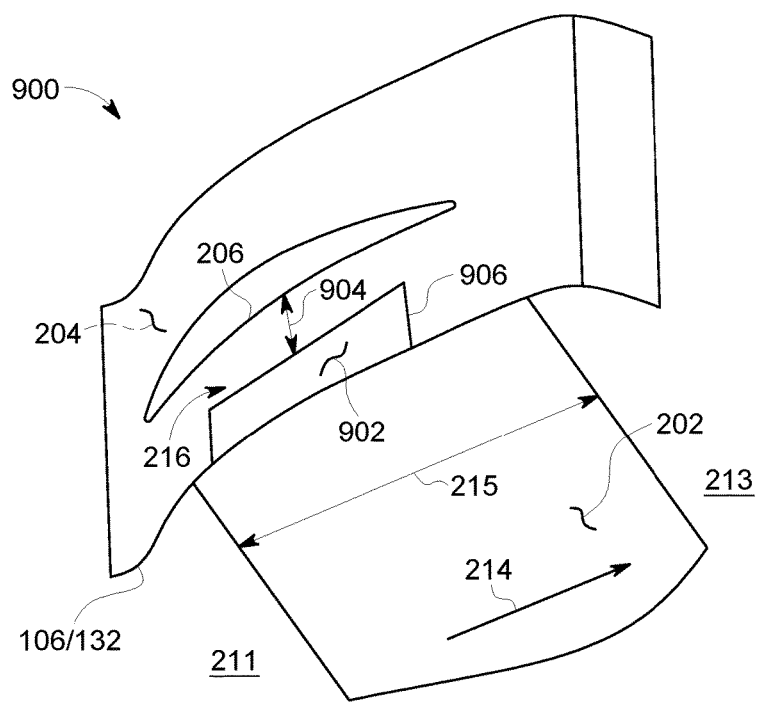
FIG. 9 is a schematic view of an additional alternative compressor bleed system that may be used with the turbomachine shown in FIG. 1.

FIG. 9 is a schematic view of an additional alternative compressor bleed system 900 that may be used with turbomachine 100 (shown in FIG. 1). In this alternative embodiment, compressor bleed system 900 includes stator vane 202 coupled to radially inner surface 204 of compressor wall 106 as described above with reference to FIGS. 3-5. Additionally, compressor bleed system 900 includes a bleed opening 902 coupled to a bleed arm (not shown) and positioned adjacent to pressure side 206. Bleed opening 902 is positioned adjacent to pressure side 206 at a predetermined offset distance 904 of stator vane 202 at radially inner surface 204. In this alternative embodiment, bleed opening 902 is axially positioned within compressor wall 106 within range 309 (shown in FIG. 4) from approximately 20% chord distance 215 upstream of leading edge 210 to approximately 20% chord distance 215 downstream of trailing edge 212. For example, bleed opening 902 is located generally within high particle impact area 216 (shown in FIG. 2). Bleed opening 902 is defined by a generally polygonal-shaped perimeter 906 on radially inner surface 204. In alternative embodiments, bleed opening 902 has any other shape, including, but not limited to, rectangular, square, elliptical, and circular that enables compressor bleed system 900 to function as described herein.

During operation, air flow 214 is channeled through compressor section 104 through stator vanes 202. A portion of air flow 214 is channeled through bleed opening 902 and into the bleed arm. In this alternative embodiment, the placement of bleed opening 902 is such that compressor bleed system 900 facilitates increasing particle entry therein and reducing particles from air flow 214.

Figure 10:
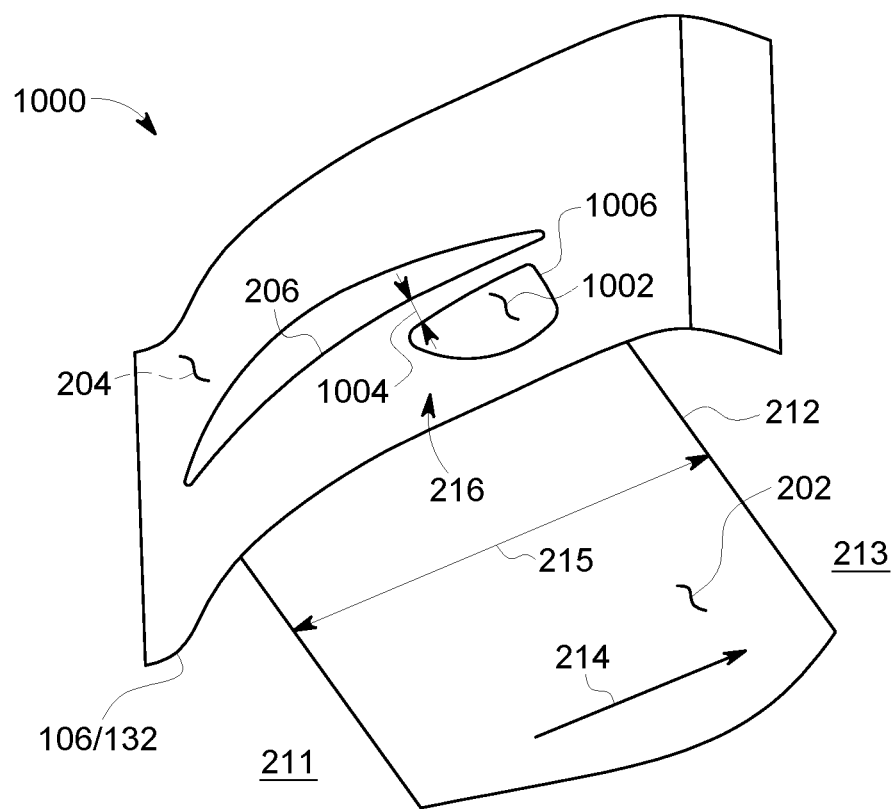
FIG. 10 is a schematic view of yet another alternative compressor bleed system that may be used with the turbomachine shown in FIG. 1.

FIG. 10 is a schematic view of yet another alternative compressor bleed system 1000 that may be used with turbomachine 100 (shown in FIG. 1). In this alternative embodiment, compressor bleed system 1000 includes stator vane 202 coupled to radially inner surface 204 of compressor wall 106 as described above with reference to FIGS. 3-5. Additionally, compressor bleed system 1000 includes a bleed opening 1002 coupled to a bleed arm (not shown) and positioned adjacent to pressure side 206. For example, bleed opening 1002 is positioned adjacent to pressure side 206 at trailing edge 212 at radially inner surface 204. In this alternative embodiment, bleed opening 1002 is slightly offset 1004 from pressure side 206 increasing aerodynamic flow of compressor air 214. Further, bleed opening 1002 is located generally within high particle impact area 216 (shown in FIG. 2). Bleed opening 1002 is defined by a generally semi elliptical-shaped perimeter 1006 on radially inner surface 204. In alternative embodiments, bleed opening 1002 has any other shape, including, but not limited to, rectangular, square, polygonal, and circular that enables compressor bleed system 1000 to function as described herein.

During operation, air flow 214 is channeled through compressor section 104 through stator vanes 202. A portion of air flow 214 is channeled through bleed opening 1002 and into the bleed arm. In this alternative embodiment, the placement of bleed opening 1002 is such that compressor bleed system 1000 facilitates increasing particle entry therein and reducing particles from air flow 214.

The above described compressor bleed systems facilitate increasing turbomachine performance. Specifically, the compressor bleed systems have a bleed arm extending from a bleed opening located within a stator passage. In some embodiments, the bleed opening is positioned such that a particle concentration within a particle-laden compressor flow is reduced within an extracted bleed air flow. Reducing particle intake of the compressor bleed air flow increases turbomachine performance and reduces maintenance costs. In other embodiments, the bleed opening is positioned such that the particle concentration within the particle-laden compressor flow is increased with the extracted bleed air flow. Reducing particles within compressor flow reduces maintenance costs of the turbomachine. Additionally, the bleed opening and bleed arm are sized such that aerodynamic flow of compressor flow and bleed air flow within is increased. Increasing aerodynamic flow of compressor flow and bleed air flow reduces flow separation and pressure losses. Moreover, locating the compressor bleed system within the stator passage facilitates reducing overall compressor length, by reducing blade row axial length, thereby reducing turbomachine weight and increasing performance.

An exemplary technical effect of the methods, systems, and apparatus described herein includes at least one of: (a) reducing particle concentration within compressor bleed air flow; (b) reducing particle concentration within compressor flow; (c) reducing blade row axial length and overall compressor length; (d) increasing aerodynamic flow properties of the bleed air flow; (e) reducing maintenance costs of turbomachines; and (f) increasing turbomachine performance.

Exemplary embodiments of methods, systems, and apparatus for compressor bleed systems are not limited to the specific embodiments described herein, but rather, components of systems and/or steps of the methods may be utilized independently and separately from other components and/or steps described herein. For example, the methods, systems, and apparatus may also be used in combination with other systems requiring extracting compressed air flow, and the associated methods, and are not limited to practice with only the systems and methods as described herein. Rather, the exemplary embodiment can be implemented and utilized in connection with many other applications, equipment, and systems that may benefit from extracting compressed air flow.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A compressor assembly for a turbomachine, said compressor assembly comprising:
   a compressor wall comprising a plurality of circumferentially spaced stator vanes substantially defining at least one row of stator vanes, said at least one row of stator vanes defining at least one stator passage therein, wherein each stator vane of said at least one row of stator vanes comprises a leading edge defining an upstream direction, an opposite trailing edge defining a downstream direction, and a pressure side, said leading edge and said trailing edge defining an axial chord distance;
   at least one bleed opening defined within said compressor wall and disposed adjacent said pressure side in said at least one stator passage at an axial position within a range from approximately 20% said axial chord distance upstream of said leading edge to approximately 20% said axial chord distance downstream of said trailing edge, said at least one bleed opening coupled in flow communication with said at least one stator passage; and
   at least one bleed arm extending from said at least one bleed opening and coupled in flow communication with said at least one stator passage, wherein compressor airflow is channelable through said at least one stator passage and at least a portion of the compressor airflow is extractable through said at least one bleed arm;
   wherein said at least one bleed arm is coupled to said compressor wall through at least one blend nose defined between said at least one bleed arm and said compressor wall, said nose comprising a blend radius greater than 2% of a stator passage height, said stator passage height defined as a distance between a compressor shroud and a compressor rotor.

2. The compressor assembly in accordance with claim 1, wherein said at least one bleed arm is defined at a bleed arm angle from said compressor wall, said bleed arm angle is within a range between approximately 20° and approximately 170°.

3. The compressor assembly in accordance with claim 1, wherein said at least one bleed arm comprises a downstream wall, wherein said at least one blend nose includes a downstream blend nose defined between said downstream wall and said compressor wall, and wherein said downstream blend nose extends radially from said compressor wall by 10% of the stator passage height into said at least one stator passage.

4. The compressor assembly in accordance with claim 1, wherein said at least one bleed opening comprises at least one first bleed opening and said at least one bleed arm comprises at least one first bleed arm, said compressor assembly further comprising:
   at least one second bleed opening defined within said compressor wall downstream of said at least one stator passage; and
   at least one second bleed arm extending from said at least one second bleed opening, wherein at least a portion of the compressor airflow is extractable through said at least one second bleed arm.

5. The compressor assembly in accordance with claim 1, wherein said at least one bleed opening comprises a continuous shape defining a perimeter formed on said compressor wall, said perimeter comprising a plurality of connected segments forming a polygon.

6. The compressor assembly in accordance with claim 1, wherein said at least one bleed opening comprises a continuous shape defining a perimeter formed on said compressor wall, said perimeter comprising a plurality of connected segments, wherein each perimeter segment of said plurality of segments is a continuously differentiable function that shares a common tangent direction at each connection point to an adjacent segment of the plurality of segments.

7. The compressor assembly in accordance with claim 1 further comprising a scavenger coupled to said at least one bleed arm.

8. The compressor assembly in accordance with claim 1, wherein said at least one bleed arm further comprises at least one stationary airfoil.

9. A compressor assembly for a turbomachine, said compressor assembly comprising:
   a compressor wall comprising a plurality of circumferentially spaced stator vanes substantially defining at least one row of stator vanes, said at least one row of stator vanes defining at least one stator passage therein, wherein each stator vane of said at least one row of stator vanes comprises a leading edge defining an upstream direction, an opposite trailing edge defining a downstream direction, and a suction side, said leading edge and said trailing edge defining an axial chord distance;
   at least one bleed opening defined within said compressor wall and disposed adjacent said suction side leading edge in said at least one stator passage at an axial position within a range from approximately 20% said axial chord distance upstream of said leading edge to approximately 20% said axial chord distance downstream of said leading edge or disposed adjacent said suction side in said at least one stator passage at an axial position within a range from approximately 10% said axial chord distance upstream of said trailing edge to approximately 20% said axial chord distance downstream of said trailing edge, said at least one bleed opening coupled in flow communication with said at least one stator passage;
   and at least one bleed arm extending from said at least one bleed opening and coupled in flow communication with said at least one stator passage, wherein compressor airflow is channelable through said at least one stator passage and at least a portion of the compressor airflow is extractable through said at least one bleed arm;
   wherein said at least one bleed arm is coupled to said compressor wall through at least one blend nose defined between said at least one bleed arm and said compressor wall, said nose comprising a blend radius greater than 2% of a stator passage height, said stator passage height defined as a distance between a compressor shroud and a compressor rotor.

10. The compressor assembly in accordance with claim 9, wherein said at least one bleed arm is defined at a bleed arm angle from said compressor wall, said bleed arm angle is within a range between approximately 20° and approximately 170°.

11. The compressor assembly in accordance with claim 9, wherein said at least one bleed arm comprises a downstream wall, wherein said at least one blend nose includes a downstream blend nose defined between said downstream wall and said compressor wall, and wherein said downstream blend nose extends radially from said compressor wall by 10% of the stator passage height into said at least one stator passage.

12. The compressor assembly in accordance with claim 9, wherein said at least one bleed opening comprises at least one first bleed opening and said at least one bleed arm comprises at least one first bleed arm, said compressor assembly further comprising:
   at least one second bleed opening defined within said compressor wall downstream of said at least one stator passage; and
   at least one second bleed arm extending from said at least one second bleed opening, wherein at least a portion of the compressor airflow is extractable through said at least one second bleed arm.

13. The compressor assembly in accordance with claim 9, wherein said at least one bleed opening comprises a continuous shape defining a perimeter formed on said compressor wall, said perimeter comprising a plurality of connected segments forming a polygon.

14. The compressor assembly in accordance with claim 9, wherein said at least one bleed opening comprises a continuous shape defining a perimeter formed on said compressor wall, said perimeter comprising a plurality of connected segments, wherein each perimeter segment of said plurality of segments is a continuously differentiable function that shares a common tangent direction at each connection point to an adjacent segment of the plurality of segments.

15. The compressor assembly in accordance with claim 9 further comprising a scavenger coupled to said at least one bleed arm.

16. The compressor assembly in accordance with claim 9, wherein said at least one bleed arm further comprises at least one stationary airfoil.

17. A method of extracting compressor airflow from a turbomachine, the turbomachine including a compressor wall including a plurality of circumferentially spaced stator vanes substantially defining at least one row of stator vanes, the at least one row of stator vanes defining at least one stator passage therein, each stator vane of the at least one row of stator vanes includes a leading edge defining an upstream direction, an opposite trailing edge defining a downstream direction, and a pressure side, the leading edge and the trailing edge defines an axial chord distance, at least one bleed opening defined within the compressor wall and disposed adjacent the pressure side in the at least one stator passage, the at least one bleed opening coupled in flow communication with the at least one stator passage, and at least one bleed arm extending from the at least one bleed opening and coupled in flow communication with the at least one stator passage, said method comprising: inducing compressor airflow in the at least one stator passage; and extracting at least a portion of the compressor airflow from the at least one stator passage at the at least one bleed opening at an axial position within a range from approximately 20% the axial chord distance upstream of the leading edge to approximately 20% the axial chord distance downstream of the trailing edge; wherein said at least one bleed arm is coupled to said compressor wall through at least one blend nose defined between said at least one bleed arm and said compressor wall, said nose comprising a blend radius greater than 2% of a stator passage height, said stator passage height defined as a distance between a compressor shroud and a compressor rotor.

18. The method in accordance with claim 17, wherein the at least one bleed opening includes at least one first bleed opening and the bleed arm includes a first bleed arm, the compressor bleed assembly further including at least one second bleed opening defined within the compressor wall downstream of the at least one stator passage and at least one second bleed arm extending from the at least one second bleed opening, said method further comprising extracting at least a portion of the compressor airflow downstream from the at least one stator passage at the at least one second bleed opening through the at least one second bleed arm.

19. A compressor assembly for a turbomachine, said compressor assembly comprising:
  a compressor wall comprising a plurality of circumferentially spaced stator vanes substantially defining at least one row of stator vanes, said at least one row of stator vanes defining at least one stator passage therein, wherein each stator vane of said at least one row of stator vanes comprises a leading edge defining an upstream direction, an opposite trailing edge defining a downstream direction, and a pressure side, said leading edge and said trailing edge defining an axial chord distance;
  at least one bleed opening defined within said compressor wall and disposed adjacent said pressure side in said at least one stator passage at an axial position within a range from approximately 20% said axial chord distance upstream of said leading edge to approximately 20% said axial chord distance downstream of said trailing edge, said at least one bleed opening coupled in flow communication with said at least one stator passage; and
  at least one bleed arm extending from said at least one bleed opening and coupled in flow communication with said at least one stator passage, wherein compressor airflow is channelable through said at least one stator passage and at least a portion of the compressor airflow is extractable through said at least one bleed arm;
  wherein said at least one bleed arm comprises a downstream wall, said at least one bleed arm coupled to said compressor wall through a downstream blend nose defined between said downstream wall and said compressor wall, downstream nose extends radially from said compressor wall by 10% of a stator passage height into said at least one stator passage, said stator passage height defined as a distance between a compressor shroud and a compressor rotor.

* * * * *